(12) United States Patent  
Page

(10) Patent No.: US 12,519,989 B2  
(45) Date of Patent: Jan. 6, 2026

(54) COLLABORATIVE VIDEO STITCHING

(71) Applicant: RexVid, LLC, Plymouth, MN (US)

(72) Inventor: James Page, Plymouth, MN (US)

(73) Assignee: RexVid, LLC, Plymouth, MN (US)

( * ) Notice: Subject to any disclaimer, the term of this patent is extended or adjusted under 35 U.S.C. 154(b) by 509 days.

(21) Appl. No.: 17/046,057

(22) PCT Filed: Apr. 9, 2019

(86) PCT No.: PCT/US2019/026587  
§ 371 (c)(1),  
(2) Date: Oct. 8, 2020

(87) PCT Pub. No.: WO2019/199831  
PCT Pub. Date: Oct. 17, 2019

(65) Prior Publication Data  
US 2021/0037273 A1    Feb. 4, 2021

Related U.S. Application Data

(60) Provisional application No. 62/655,063, filed on Apr. 9, 2018.

(51) Int. Cl.  
*H04N 21/234* (2011.01)  
*H04N 5/265* (2006.01)  
*H04N 21/258* (2011.01)

(52) U.S. Cl.  
CPC ....... *H04N 21/23424* (2013.01); *H04N 5/265* (2013.01); *H04N 21/258* (2013.01)

(58) Field of Classification Search  
CPC ...................................................... H04N 21/20  
See application file for complete search history.

(56) References Cited

U.S. PATENT DOCUMENTS 9,426,543 B1 *   8/2016   Li ................... H04N 21/2353  
2007/0088817 A1   4/2007   Li  
(Continued)

FOREIGN PATENT DOCUMENTS

WO    2017106749 A1    6/2017

OTHER PUBLICATIONS

PCT International Search Report and Written Opinion dated Jun. 27, 2019 for International Application No. PCT/US2019/026587, from which the instant application is based, 12 pages.

*Primary Examiner* — Mushfikh I Alam  
(74) *Attorney, Agent, or Firm* — Fredrikson & Byron, P.A.

(57) ABSTRACT

Methods and systems of creating a collaborative video for a recipient are disclosed. A video stitching server may receive a collaborative video request from a collaborative video application running on an initiator's mobile device. The video stitching server may store the collaborative video request in a folder that has an identifier. The identifier may be provided to potential contributors. The video stitching server may receive contributor video information—including contributor videos and the identifier—from contributors' collaborative video applications and may store the contributor videos in the folder based on the identifier. The video stitching server may then stitch together at least two videos stored in the folder to create a collaborative video and may deliver the collaborative video to the collaborative video application miming on a recipient's mobile device.

20 Claims, 10 Drawing Sheets

Send invite to contributors

(56) References Cited

U.S. PATENT DOCUMENTS

| | | | |
|---|---|---|---|
| 2010/0214419 A1 | 8/2010 | Kaheel et al. | |
| 2011/0030031 A1* | 2/2011 | Lussier | G06F 3/0481 |
| | | | 709/219 |
| 2012/0314015 A1 | 12/2012 | Watson et al. | |
| 2012/0317492 A1* | 12/2012 | Sheeder | H04N 21/25891 |
| | | | 715/738 |
| 2013/0080897 A1 | 3/2013 | Han et al. | |
| 2013/0151970 A1* | 6/2013 | Achour | G06Q 10/101 |
| | | | 715/723 |
| 2013/0247120 A1* | 9/2013 | Milgramm | H04N 21/4882 |
| | | | 725/110 |
| 2013/0283319 A1* | 10/2013 | Marshall | H04N 21/2743 |
| | | | 725/61 |
| 2014/0298373 A1* | 10/2014 | Jing | H04N 21/632 |
| | | | 725/28 |
| 2015/0143443 A1* | 5/2015 | Boyle | H04N 21/4756 |
| | | | 725/110 |
| 2015/0318020 A1* | 11/2015 | Pribula | H04N 21/2743 |
| | | | 386/290 |
| 2017/0006314 A1* | 1/2017 | Danovitz | H04L 65/762 |
| 2017/0230719 A1* | 8/2017 | Groman | H04N 21/47205 |
| 2018/0041634 A1 | 2/2018 | Geller et al. | |
| 2018/0255332 A1* | 9/2018 | Heusser | H04H 20/18 |
| 2018/0301169 A1* | 10/2018 | Ricciardi | G11B 27/036 |
| 2018/0338119 A1* | 11/2018 | Hoffman | H04L 65/1089 |
| 2019/0132492 A1* | 5/2019 | Paluri | H04N 21/4788 |
| 2023/0385327 A1* | 11/2023 | Green | H04N 21/4784 |
| 2024/0106975 A1* | 3/2024 | Molholm | H04N 21/242 |

\* cited by examiner

Splash screen

Home page

Who's it for?

What is the occasion?

Invite collaborators

Invite collaborators

Up to 3 is free

Pay for more than 3 collaborators

Shoot video

Select video and upload to cloud

Send invite to contributors

Success message!
Invitations have been sent.

Watch other contributors

Manage contributor list

User gets a text to collaborate

The contributor can see others and add their Vid

They shot and uploaded their video

Success! AND invited to start their own RexVid project

Recipient receives text

Watches RexVid

Shares RexVid on social media or saves to device

COLLABORATIVE VIDEO STITCHING

RELATED APPLICATION

This application is a National Stage filing from International Patent Application No. PCT/US2019/026587, filed Apr. 9, 2019, which claims the benefit of U.S. Provisional Application No. 62/655,063 filed Apr. 9, 2018, the contents of which are hereby incorporated by reference.

TECHNICAL FIELD

This disclosure generally relates to devices, systems, and methods for creating collaborative videos.

BACKGROUND

Videos can be a meaningful way to capture important moments and to express sentiments to loved ones. In many instances, capturing important moments via video is preferable compared to capturing them via still photo. Similarly, expressing sentiments to loved ones via video may be preferable compared to using notes or greeting cards.

SUMMARY

Embodiments discussed herein include a server that is configured to receive a request from a mobile application to create a collaborative video, receive videos from mobile applications, automatically stitch the videos together into a single video, and then send the video to a mobile application for viewing. One mobile application can be running on a mobile device of a person who initiates the video collaboration.

Some video collaborations may be for the purpose of expressing a certain sentiment—akin to a greeting card. For example, an initiator may arrange for a certain group of people to record short Happy Birthday videos for a recipient. Some or all of those people (and the initiator) can use their mobile applications to record and upload their Happy Birthday videos. The server can then stitch the videos together and deliver the Happy Birthday collaborative video to the recipient on his/her mobile application. In certain circumstances, the video can be made to celebrate any occasion including, for example, engagements, weddings, new babies, anniversaries, birthdays, get well soon occasions, work promotions, or simply "just because" occasions.

Some video collaborations may be for the purpose of capturing moments at an important event—akin to inviting guests to take photos using disposable cameras. For example, an initiator may enable wedding guests to use a mobile application to record short videos to capture aspects of the wedding from the guests' perspectives. The guests may use their mobile applications to record and upload videos. The server can then stitch the videos together and deliver the collaborative video to the bride and groom on their mobile applications.

Video collaborations may be used in a variety of contexts. For example, educators may receive and evaluate video assignments from a class of students while looking at only a single video file. In another example, multiple training videos may be stitched together and shared as a single video file with repair teams in the field. In another example, videos from multiple employees may be stitched together to recognize one of their co-workers. Video collaborations may serve a variety of purposes.

Embodiments discussed herein provide a variety of advantages. For example, the server can stitch the videos together without requiring manual video-editing effort (e.g., by a video editor). In some embodiments, contributors can be able to view collaboration invitations, record videos, and upload videos easily through their mobile applications. Collaborative videos can be easy to plan and implement. Recipients can view multiple videos as a single collaborative video. Recipients may easily store collaborative videos and share collaborative videos on social media.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and provides some practical illustrations and examples. Those skilled in the art will recognize that many of the noted examples have a variety of suitable alternatives. A number of various exemplary collaborative video stitching apparatus and methods are disclosed herein using the description provided as follows in addition to the accompanying drawings. Each of the embodiments disclosed herein can be employed independently or in combination with one or more (e.g., all) of the other embodiments disclosed herein.

Figure 1:
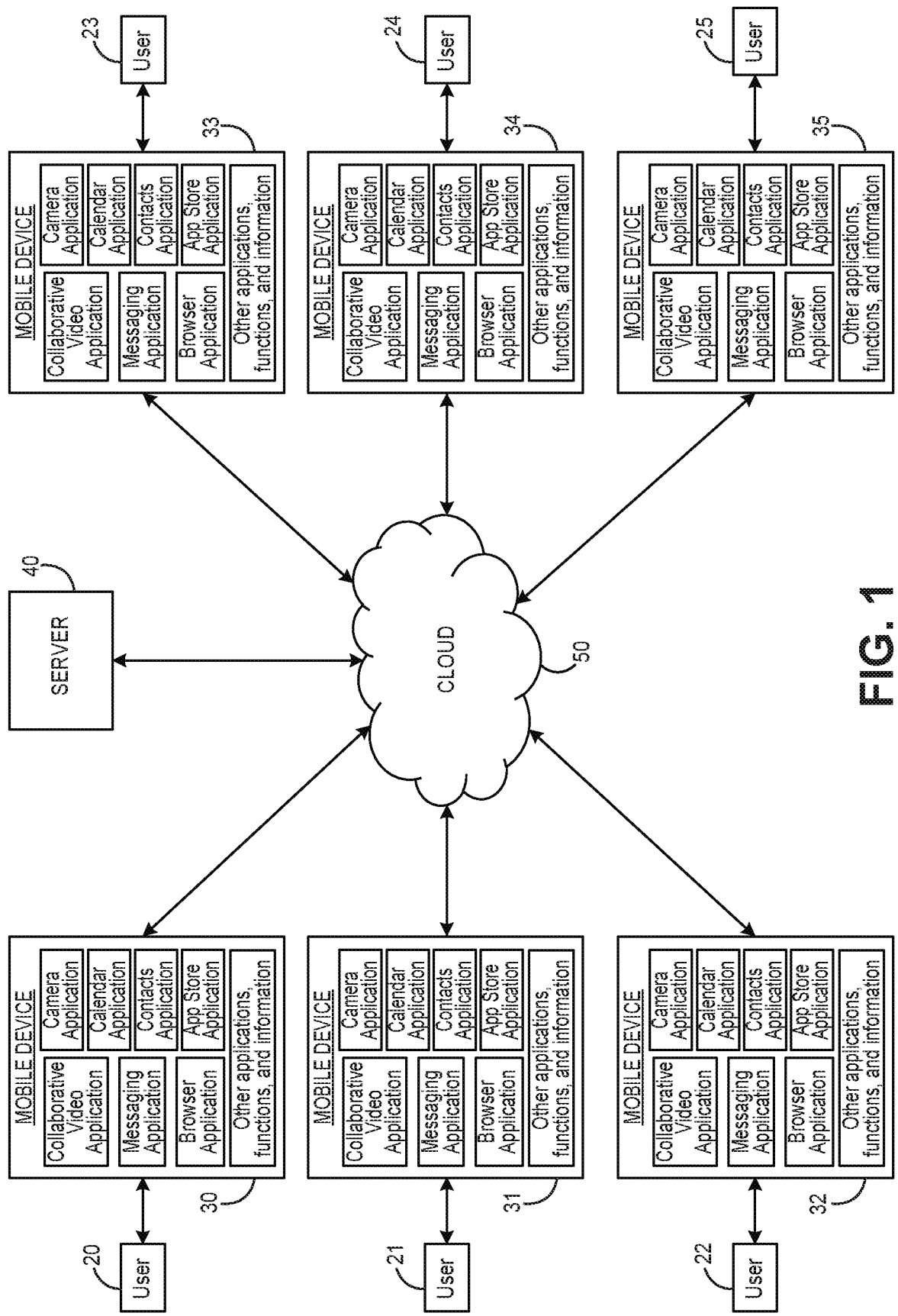
FIG. 1 is a schematic drawing of an illustrative cloud-based system for creating a collaborative video for a recipient.

FIG. 1 illustrates a system that may be used to create collaborative videos. As shown, the system may include multiple users 20-25, each of whom may have a mobile device 30-35. The users 20-25 may interact with a server 40 via their mobile devices 30-35 and the cloud 50. In many embodiments discussed herein, the server 40 can be configured to stitch videos together, among other functions. Each mobile device 30-35 may include various mobile applications. The mobile devices 30-35 shown in FIG. 1 have a collaborative video application, a messaging application, a browser application, a camera application, a contacts application, and an app store application. As shown, the mobile devices 30-35 may include other applications, functions, and information.

Figure 2A:
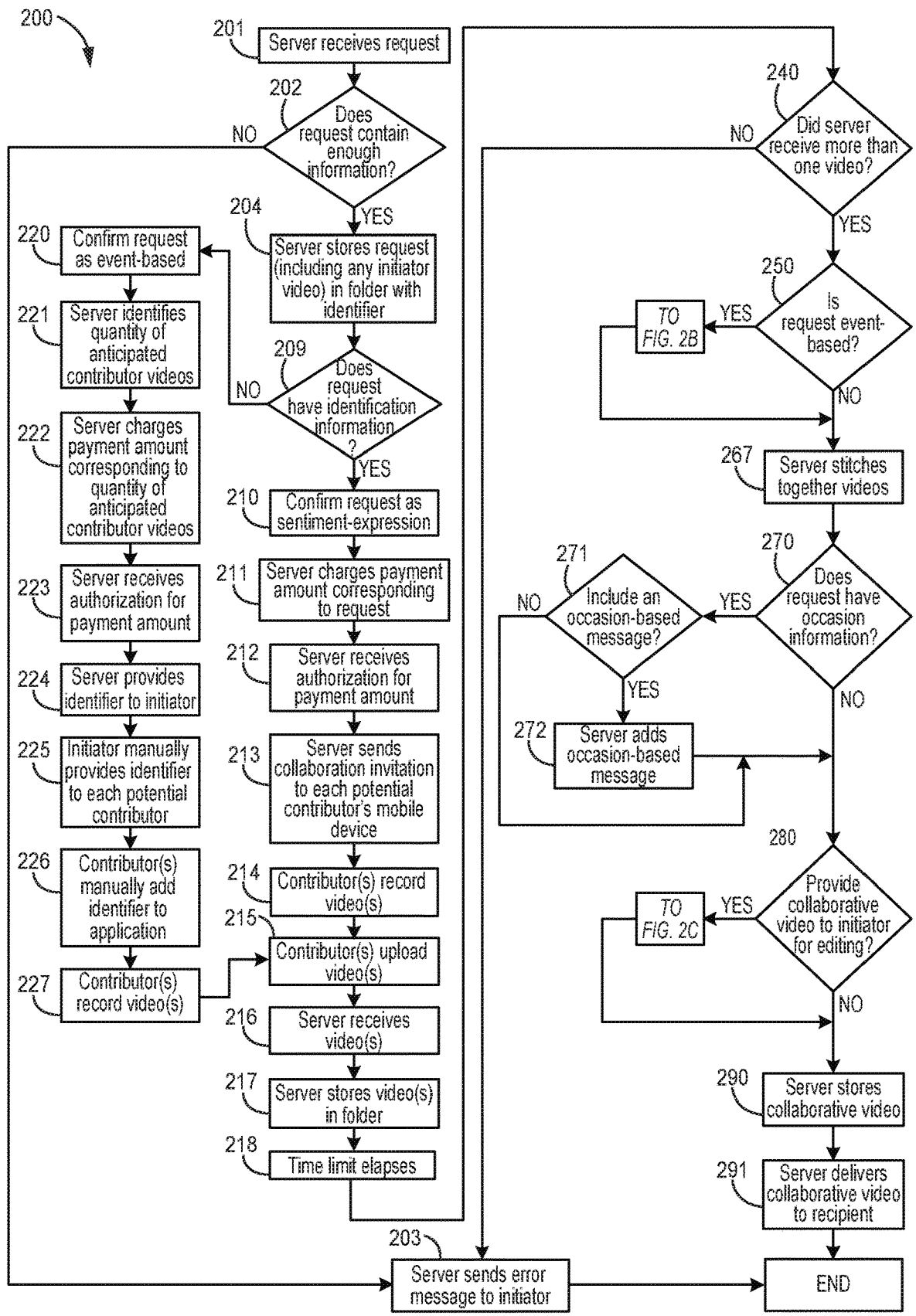
FIGS. 2A-2C are a flow chart of an illustrative method for creating a collaborative video for a recipient.
Figure 2B:
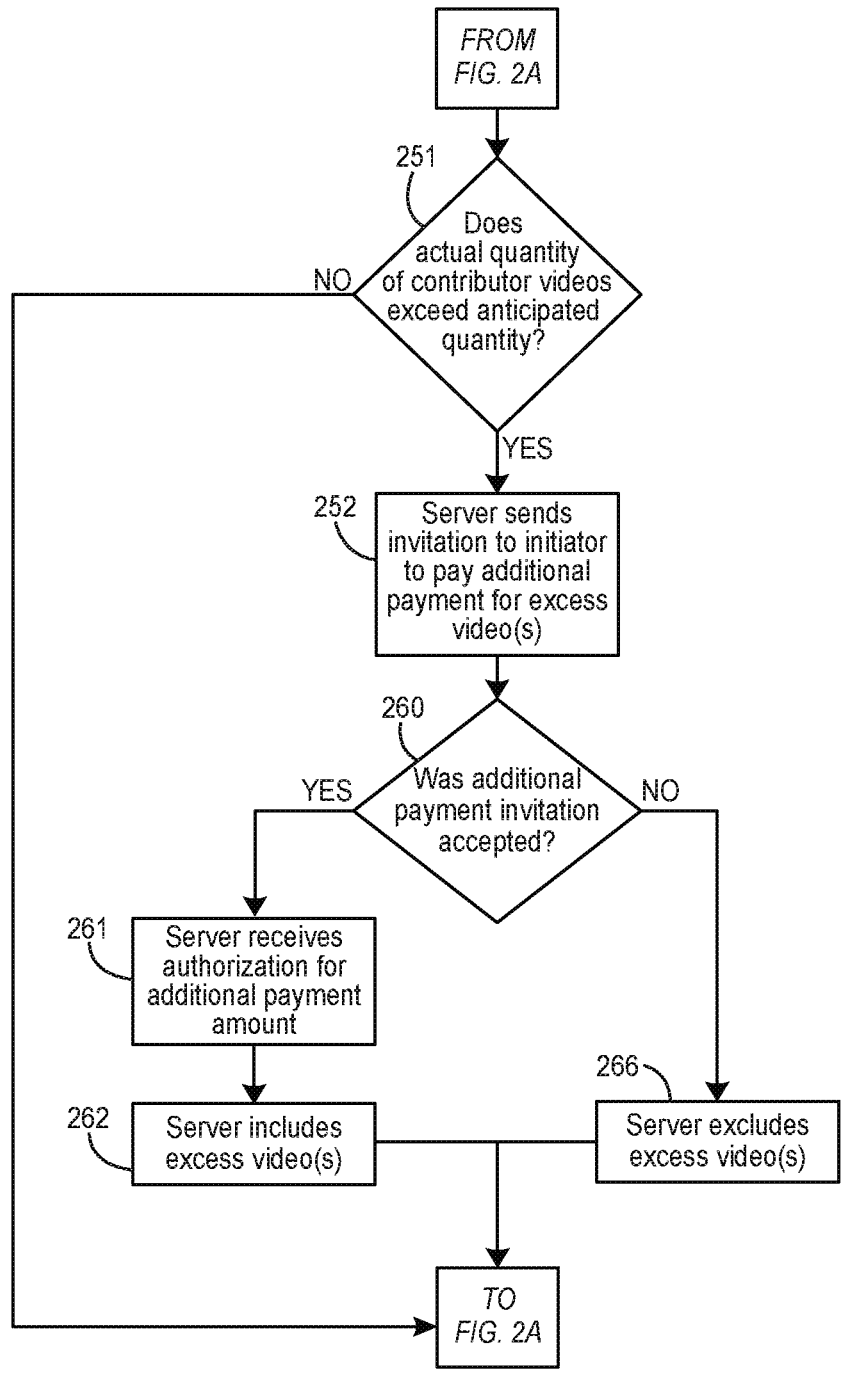
Figure 2C:
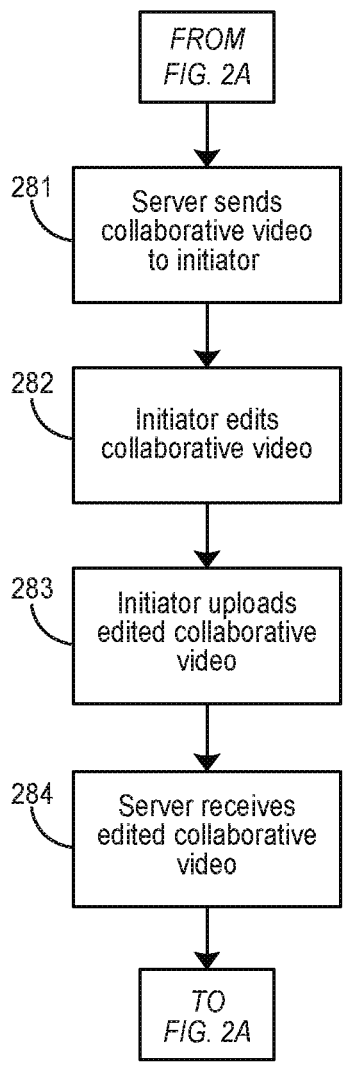

FIGS. 2A-2C illustrate a method of creating a collaborative video and refer to components illustrated in FIG. 1. In some embodiments, an initiator can begin creating the collaborative video for a recipient by sending a collaborative video request to a video stitching server. For example, user 20 may be the initiator and may use the collaborative video application on his/her mobile device 30 to generate a collaborative video request. Referring again to FIG. 1, user 20 may then use his/her collaborative video application to send the collaborative video request through the cloud 50 to the video stitching server 40. FIGS. 3A-3H show illustrative graphical user interfaces of a collaborative video application that may be used by an initiator to generate and send a collaborative video request. The method (200) of FIGS. 2A-2C can include receiving the collaborative video request at the video stitching server 40 from the collaborative video application (201).

The video stitching server 40 can evaluate the collaborative video request received from the initiator's collaborative video application. For example, the video stitching server 40 can determine whether the collaborative video request contains enough information for the video stitching server 40 to create a collaborative video (202). For example, the video stitching server 40 may determine whether the collaborative video request includes information about the ultimate recipient of the collaborative video, information about potential contributors to the collaborative video, a quantity of potential contributors to the collaborative video, information about the occasion for the collaborative video (e.g., birthday, wedding, class reunion, family reunion, condolences, thank you, etc.), information about when the collaborative video is to be completed and delivered, and/or a variety of other kinds of information. In many embodiments, a complete collaborative video request can include recipient information. If the video stitching server 40 determines that the collaborative video request does not contain enough information to create a collaborative video, the video stitching server 40 can send an error message to the initiator (203). For instance, in the example provided above, the video stitching server 40 can send an error message to the collaborative video application running on the mobile device 30 of user 20.

If the video stitching server 40 determines that the collaborative video request does not contain enough information for the video stitching server 40 to create a collaborative video (202), the video stitching server 40 can store the collaborative video request in a folder that has an identifier (204). The folder can be on the video stitching server 40. The identifier can indicate where on the video stitching server information related to the collaborative video request is stored. As discussed in greater detail elsewhere herein, the identifier can accompany various communications among the video stitching server 40 and users 20-25 for purposes of associating the various communications with a particular collaborative video project.

Figure 3A:
FIGS. 3A-3U are illustrative graphical user interfaces of a collaborative video application.
Figure 3B:
Figure 3C:
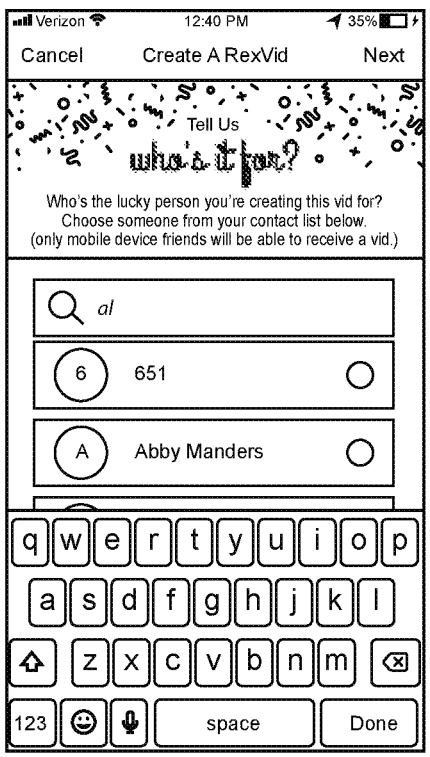
Figure 3D:
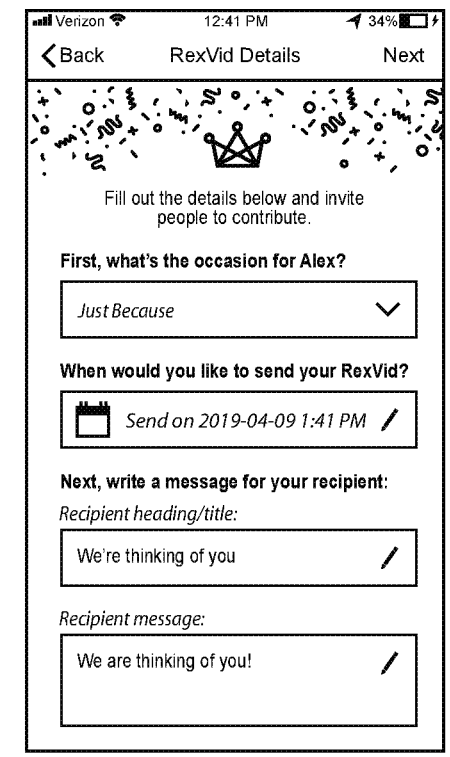
Figure 3E:
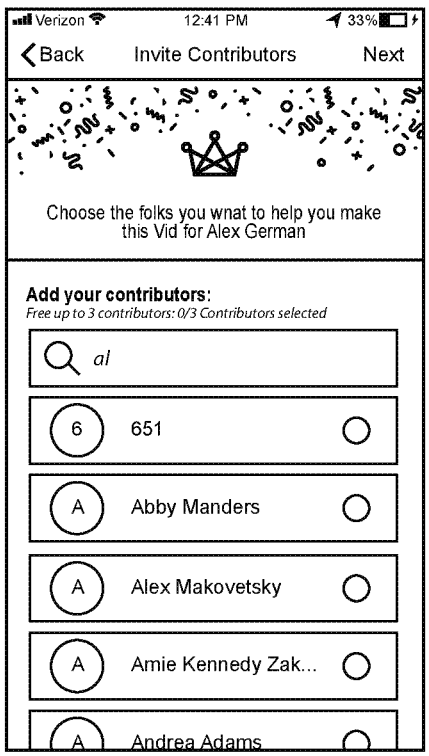
Figure 3F:
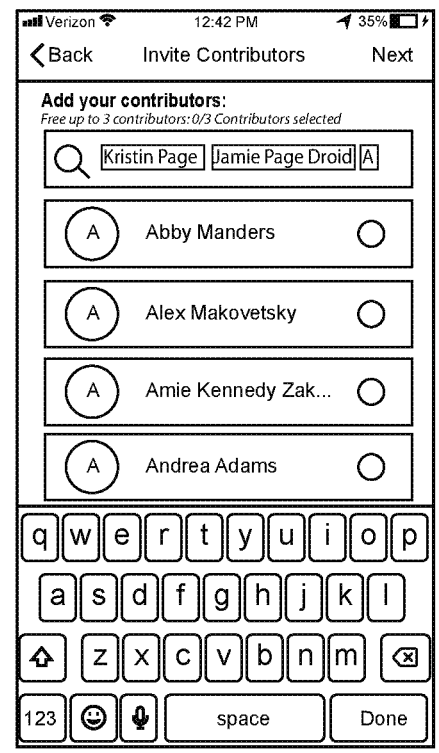
Figure 3G:
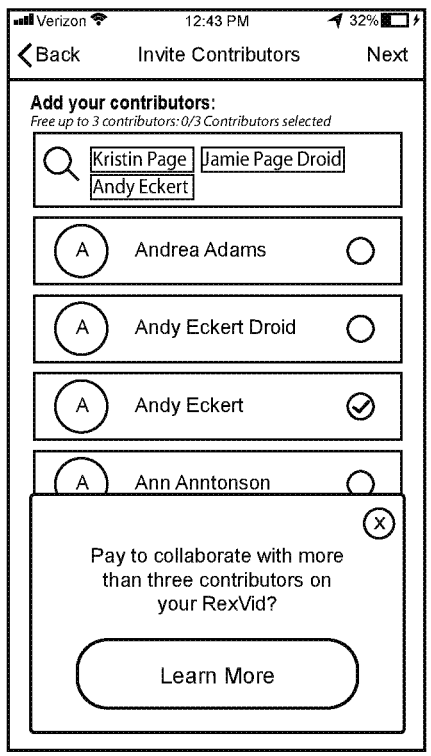
Figure 3H:
Figure 3I:
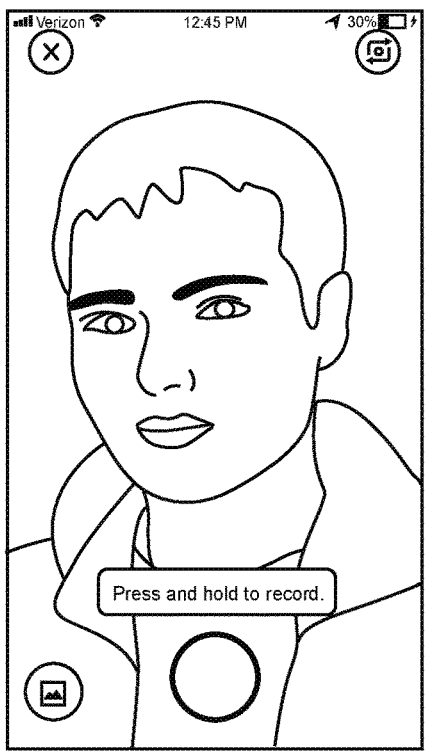
Figure 3J:
Figure 3K:
Figure 3L:
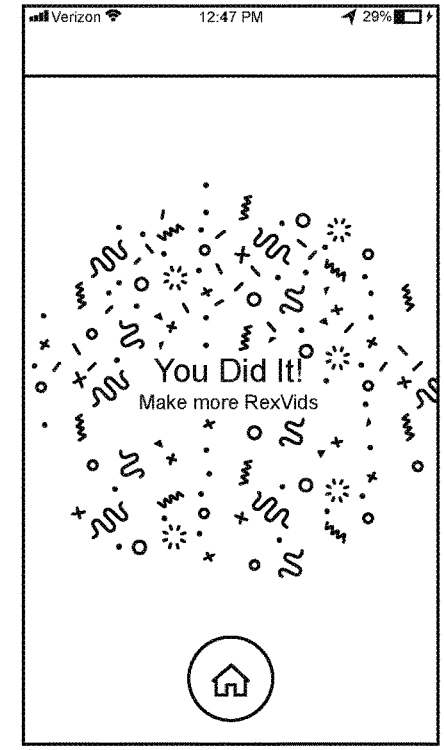
Figure 3M:
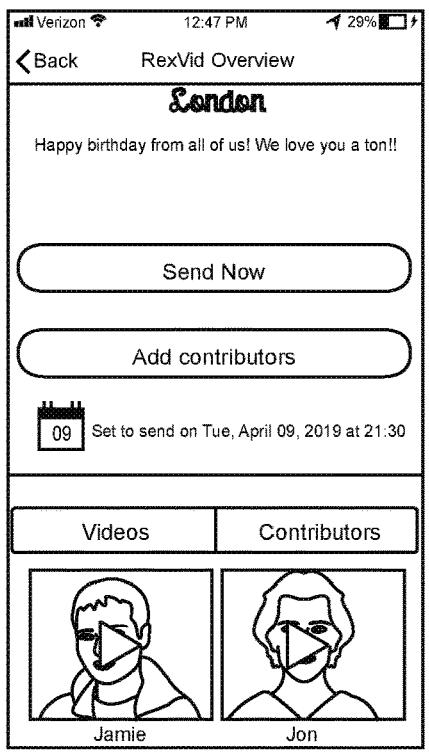
Figure 3N:
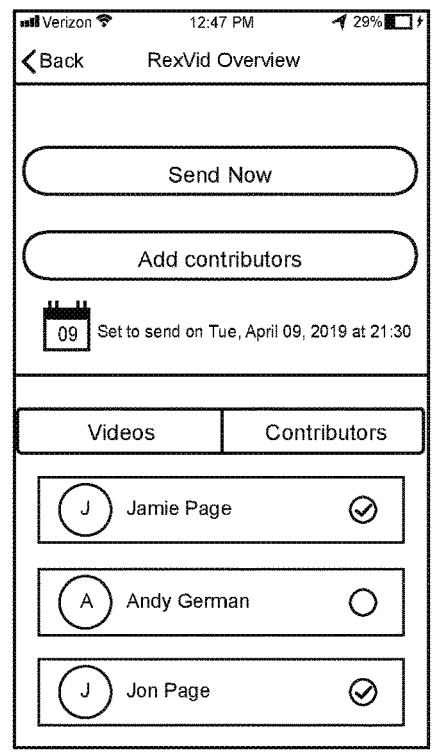

In some instances, the collaborative video request can include an initiator video. For example, if a requested collaborative video is a sentiment-expression video (e.g., a happy birthday video), the initiator may include a video expressing the specified sentiment to be included in the collaborative video. In some cases, the initiator's video may appear first in the collaboration to introduce the sentiment-expression collaborative video (e.g., "Mom, your kids wanted to wish you Happy Mother's Day, so we created this collaborative video for you."). FIGS. 3I-3J show illustrative graphical user interfaces of a collaborative video application that may be used by an initiator to record and upload a video.

The video stitching server 40 may determine what kind of collaborative video is being requested in the collaborative video request. Some collaborative video requests are for sentiment-expression videos to express one or more sentiments to the recipient(s) of the collaborative video. Such collaborative video requests may include potential contributor identification information. For instance, in the Mother's Day example provided above, the initiator child may provide identification information for his/her siblings in the collaborative video request. In some embodiments, the collaborative video application interacts with the contacts application and allows the initiator to easily include contact information for each potential contributor. Some collaborative video requests are for event-based videos to capture various moments in an event from the perspective of multiple contributors. Such collaborative video requests may not include identification information for the potential contributors but may include a quantity of anticipated contributor videos. For instance, if a bride or groom initiates an event-based collaborative video request to capture videos of their wedding, she/he may include in the collaborative video request that the anticipated quantity of contributor videos is below a predetermined number. The initiator can indicate a quantity of anticipated contributor videos in his/her collaborative video application.

The video stitching server 40 may determine whether the collaborative video request has identification information of the potential contributors (209). In many embodiments, a collaborative video request has either potential contributor identification information if it is a request for a sentiment-expression video or a quantity of anticipated contributor videos if it is a request for an event-based video. If the video stitching server 40 determines that the collaborative video request has potential contributor identification information for the potential contributor(s) (209), the video stitching server 40 may confirm the collaborative video request as one for a sentiment-expression collaborative video (210).

The video stitching server 40 may charge a payment amount to the initiator through his/her collaborative video application for such a sentiment-expression collaborative video (211). The payment amount can correspond to the collaborative video request. For example, the video stitching server 40 may charge a first payment amount for a first number (or range) of potential contributors, a second payment amount for a second number (or range) of potential contributors, and so on. In some embodiments, the video stitching server 40 can receive authorization for the payment amount from the initiator's collaborative video application (212).

When the video stitching server 40 receives authorization for the payment amount (212), the video stitching server 40 may begin gathering sentiment-expression videos to be stitched together by sending a collaboration invitation to mobile devices of each potential contributor (213). For example, if user 20 is the initiator, he/she may identify users 21-25 as potential contributors in the collaborative video. User 20 may include identification information for each of users 21-25 in the collaborative video request. Such identification information may include contact information for each of users 21-25 pulled from the contacts application into the collaborative video application on the mobile device 30 of user 20. The video stitching server 40 may use the identification information to send a collaboration invitation to each of mobile devices 31-35 of users 21-25 (213).

In many embodiments, the collaboration invitation may include a variety of information. For example, the collaboration invitation can include the identifier so that any videos provided by the potential contributors are stored with the proper folder in the video stitching server 40. The collaboration invitation may include initiator information (e.g., the name of the initiator) and/or the recipient information (e.g., the name of the recipient). The collaboration invitation may include a request to record a video using the collaborative video application running on the potential contributor's mobile device and to upload the video to the video stitching server using the collaborative video application. For instance, in the Mother's Day example provided above, each of users 21-24 may be siblings of user 20 and may receive a sentiment-expression collaboration invitation on their mobile devices 31-34. The collaboration invitation may include the name of user 20, the name of their mother, and a request to record and upload a Happy Mother's Day video on their collaborative video application and upload it to the video stitching server 40.

Figure 3O:
Figure 3P:
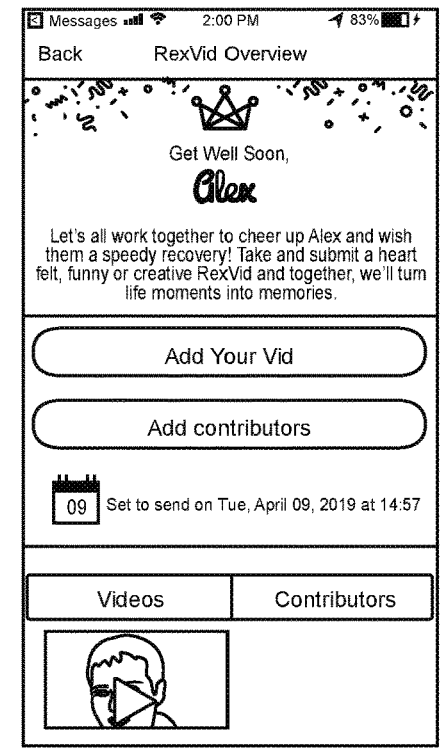

In some embodiments, the video stitching server 40 may send the collaboration invitation to the potential contributors' mobile devices via text message. In particular, the video stitching server 40 may send a text message with a link to each potential contributor, to be received by the messaging application of the potential contributor's mobile device. The text message can include a link to the potential contributor's collaborative video application, such that, when the user clicks on the link, the collaborative video application opens (see FIG. 3O). In some embodiments, the link can be configured to re-direct the potential contributor's mobile device to an application store (or an app store application) if the potential contributor's mobile device does not yet have the collaborative video application. When the potential contributor opens his/her collaborative video application via the text message (directly or indirectly) (see FIG. 3P), the identifier of the collaborative video project can populate in the collaborative video application. In many embodiments, the video stitching server 40 may send the content of the collaboration invitation directly to the potential contributors' collaborative video applications. In some such embodiments, the video stitching server 40 may send a text message to the potential contributors' mobile devices to notify them of the collaboration invitation. In some embodiments, the potential contributors' collaborative video applications may provide in-app notifications (e.g., banners, sounds, badges, etc.) to the potential contributors to notify them of the collaboration invitation.

Figure 3Q:
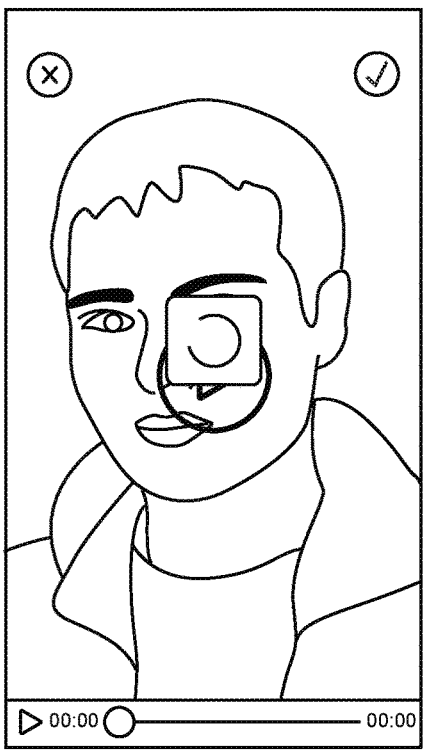
Figure 3R:

In many instances, not all of the identified potential contributors will actually respond to the collaboration invitation and record and upload a sentiment-expression video to the video stitching server 40. The potential contributors who record and upload a video may be referred to as contributors. In response to the collaboration invitation, one or more contributors may record one or more videos (214) and upload the video(s) to the video stitching server 40 (215). The contributors may use the collaborative video application in conjunction with the camera application on their mobile devices to record the videos and then upload the videos to the video stitching server 40 via the cloud 50 (215) (FIG. 3Q). The contributor video(s) may be packaged with other contributor information, such as identification information associated with the contributor(s). In some embodiments, contributors need interact only with their collaborative video application. The collaborative video application user interface may enable contributors to press a button to begin and end recording of the video and to press a button to upload the video. The collaborative video application user interface may enable contributors to re-take videos before uploading by deleting videos and allowing contributors to record new videos before uploading.

As noted above, the video stitching server 40 may determine whether a collaborative video request is for a sentiment-expression video or an event-based video by determining whether the collaborative video request has identification information of the potential contributors (209). If the video stitching server 40 determines that the collaborative video request does not have such identification information (209), the video stitching server 40 may confirm the collaborative video request as one for an event-based video (220). In many instances, such event-based collaborative video requests need not have a definite number of potential contributors. The video stitching server 40 may identify a quantity of anticipated contributor videos from the event-based collaborative video request (221). For example, if the occasion is a class reunion, the initiator may anticipate somewhere between X number and Y number of guests at the reunion and may anticipate one video per guest. The initiator may use his/her collaborative video application to create an event-based collaborative video request that indicates a quantity of anticipated contributor videos of between X and Y.

The video stitching server 40 may charge a payment amount to the initiator through his/her collaborative video application for such an event-based collaborative video (222). The payment amount can correspond to the collaborative video request. For example, the video stitching server 40 may charge a first payment amount for a first quantity (or range) of anticipated contributor videos, a second payment amount for a second quantity (or range) of anticipated contributor videos, and so on. In some embodiments, the video stitching server 40 can receive authorization for the payment amount from the initiator's collaborative video application (223).

When the video stitching server 40 receives authorization for the payment amount (223), the video stitching server 40 may enable the initiator to begin the process of gathering event-based videos to be stitched together by providing the identifier to the initiator (224).

The video stitching server 40 may send the identifier to the initiator's collaborative video application. In some instances, the initiator's collaborative video application may display the identifier on the initiator's mobile device. In some embodiments, the initiator's collaborative video application may display a QR or similar code that is associated with the identifier on the initiator's mobile device.

The initiator may then provide the identifier to each of the potential contributors to the event-based collaborative video (225). For example, the initiator may print the identifier or a QR or similar code on a document that is visible to those who may attend, or who are currently attending, the event (e.g., on a wedding invitation, program, or reception display). The document may also include instructions for downloading and/or using the collaborative video application and/or an invitation to contribute videos to the collaborative video. In some instances, the initiator may manually provide the identifier to potential contributors through social media.

As in the sentiment-expression collaborative videos, some potential contributors to the event-based collaborative video may actually contribute one or more videos to the collaboration. Such contributors may enter the identifier into their collaborative video applications to ensure that any videos they contribute will be associated with the proper collaborative video project (226). For example, a contributor may type the identifier into his/her collaborative video application. In another example, the contributor may use a QR code reader application on his/her mobile device to scan a QR code provided by the initiator, thereby entering the identifier into his/her collaborative video application. In another example, the contributor may copy the identifier from social media into his/her collaborative video (or click on a link in social media to open the collaborative video application, pre-populated with the identifier). In another example, the initiator may provide the identifier (225) and the contributor may enter the identifier to his/her collaborative video application (226) by means of a short-range communication protocol. Various methods of manually providing the identifier (225) and manually entering the identifier (226) are possible.

Contributors to event-based collaborative videos may record one or more videos with their collaborative video applications (227). For example, users 21-25 may be guests at a wedding reception. Users 22, 23, and 25 may each use the collaborative video application in conjunction with the camera application on his/her mobile device 32, 33, 35 to record one or more videos at the wedding reception. Such contributors to event-based collaborative videos may then upload their videos to the video stitching server 40 via the cloud 50 (215). Each contributor video may be packaged with other contributor information, such as identification information associated with the contributor. In some embodiments, contributors need interact only with their collaborative video application. The collaborative video application user interface may enable contributors to press a button to begin and end recording of the video and to press a button to upload the video. The collaborative video application user interface may enable contributors to re-take videos before uploading by deleting videos and allowing contributors to record new videos before uploading. In some embodiments, the initiator may view the contributor videos on his/her collaborative video application as they are uploaded, before they are stitched together.

As noted, contributor videos may be uploaded to the video stitching server 40 along with the relevant identifier (215). The video stitching server 40 may receive contributor video information (e.g., contributor videos, the identifier, contributor identification information, etc.) from the collaborative video applications running on the contributors' mobile devices. When the video stitching server 40 receives the contributor video information (216), the video stitching server may store the contributor video information in the folder based on the identifier (217). The identifier may indicate the folder's location on the video stitching server 40. In many embodiments, the identifier can aid the video stitching server 40 in making sure all information associated with a collaborative video project is stored in the same folder.

At some point between the initiator creating the collaborative video request and ultimate delivery of the collaborative video to the recipient, a time limit may elapse (218). When the time limit elapses, the video stitching server 40 may begin the process of stitching together the collaborative video. In some instances, the initiator may determine the time limit by specifying a delivery time in the collaborative video request. In such instances, the time limit may be before the specified delivery time by an amount of time sufficient for the video stitching server 40 to stitch the collaborative video together and deliver it to the recipient. In some such instances, the time limit may be before the specified delivery time by an amount of time sufficient for the initiator to edit the stitched-together collaborative video (discussed in greater detail elsewhere herein) before the video stitching server 40 delivers the edited version. In some instances, the initiator may determine the time limit by specifying an edit time in the collaborative video request. In such instances, the time limit may be before the specified edit time by an amount of time sufficient for the video stitching server 40 to stitch the collaborative video together and deliver it to the initiator for editing. In creating some event-based collaborative videos, the time limit may coincide with the conclusion of the event.

The video stitching server 40 may begin the process of stitching together videos in the folder to create the collaborative video. The video stitching server 40 may determine whether there is more than one video in the folder (240). If there is only one video or no videos, the video stitching server 40 may be unable to stitch together a collaborative video and may send an error message to the initiator's collaborative video application (203). If there is more than one video in the folder (240), the process of stitching videos together to create the collaborative video may continue. In some instances, the at least two videos stored in the folder can include an initiator video and one or more contributor videos.

If the collaborative video request is event-based, the video stitching server 40 may need to compare the quantity of actual contributor videos stored in the folder with the quantity of anticipated contributor videos. The video stitching server 40 may determine whether the collaborative video request is event-based (250). If the collaborative video request is event-based, referring to FIG. 2B, the video stitching server 40 may determine whether the quantity of actual contributor videos exceeds the anticipated quantity of contributor videos (251). If the actual quantity of contributor videos does not exceed the anticipated quantity of contributor videos, the video stitching server 40 can determine that the payment amount authorized by the initiator is sufficient, and the process of creating the collaborative video can continue. If the actual quantity of contributor videos exceeds the anticipated quantity of contributor videos, the video stitching server 40 can determine how many excess videos are in the folder. The video stitching server 40 can send an invitation to the initiator's collaborative video application to pay an additional payment amount that corresponds to the excess video quantity (252). The initiator may decide to pay or not pay the additional payment amount (260). If the initiator decides to pay the additional payment amount, he/she may use his/her collaborative video application to authorize payment of the additional payment amount. When the video stitching server 40 receives authorization for the payment of the additional payment amount (261), the video stitching server 40 may include the excess videos among the videos to be stitched together to create the collaborative video (261). If the initiator decides not to pay the additional payment amount, the video stitching server 40 may receive notice of the initiator's decision and exclude the excess videos from among the videos to be stitched together to create the collaborative video (266).

Referring again to FIG. 2A, the video stitching server 40 may stitch together the contributor videos (at least two) stored in the folder to create the collaborative video (267). The video stitching server 40 may combine the multiple video files into a single video file, with the individual videos playing sequentially in the collaboration. In many embodiments, the contributor videos (and an initiator video) may each include a time stamp, and the video stitching server 40 may be able to stitch the videos together in chronological order based on the time stamps. In some embodiments, the initiator may be able to specify an order of the videos for the collaboration.

As noted, some collaborative video requests are occasion-specific. A collaborative video request may have occasion information (e.g., an indication that the collaborative video will be to express a certain sentiment on a particular holiday or life event, an indication that the collaborative video will be to commemorate a particular event, etc.). In some cases, the occasion may be "just because." The video stitching server 40 may determine whether the collaborative video request includes occasion information (270). If the collaborative video request does not have occasion information, the video stitching server 40 may continue the process of creating and delivering the collaborative video. If the collaborative video request has occasion information, the video stitching server 40 may determine whether to include an occasion-based message with the collaborative video (271). For example, the occasion-based message may include an introductory video referencing the occasion (e.g., "50 Years of Marriage for Arnold and Kathy!"), music that relates to the occasion, or other kinds of messages commemorating the occasion. If the video stitching server 40 determines that an occasion-based message should not be included with the collaborative video (271), the video stitching server 40 can continue the process of creating and delivering the collaborative video. If the video stitching server 40 determines that an occasion-based message should be included with the collaborative video (271), the video stitching server 40 can add the occasion-based message (272) and then continue the process of creating and delivering the collaborative video. As discussed below, the video stitching server 40 can deliver the occasion-based message to the recipient's collaborative video application along with the collaborative video.

In some embodiments, an initiator may be able to edit the collaborative video before it is delivered to the recipient. The video stitching server 40 may determine whether to provide the collaborative video to the initiator for editing (280). If the video stitching server 40 determines providing the collaborative video to the initiator for editing is unnecessary (280), the process of delivering the collaborative video can continue. If the video stitching server 40 determines that the collaborative video should be provided to the initiator for editing (280), referring to FIG. 2C, the video stitching server 40 can provide the collaborative video to the initiator (281). The initiator can then edit the collaborative video, creating an edited version of the collaborative video (282). The initiator can use his/her collaborative video application to edit the collaborative video. For example, the user may be able to reorder the contributor videos in the collaborative video, remove offensive or otherwise problematic videos from the collaborative video, add augmented reality, apply video filters, and so on. When the initiator has edited the collaborative video, the initiator can upload the edited version of the collaborative video to the video stitching server 40 via the cloud 50 (283). The video stitching server 40 can receive the edited version of the collaborative video from the initiator's collaborative video application (284).

Figure 3S:
Figure 3T:
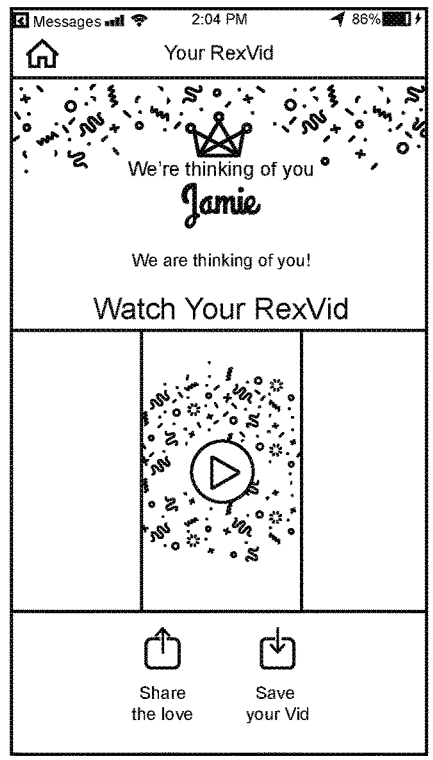
Figure 3U:
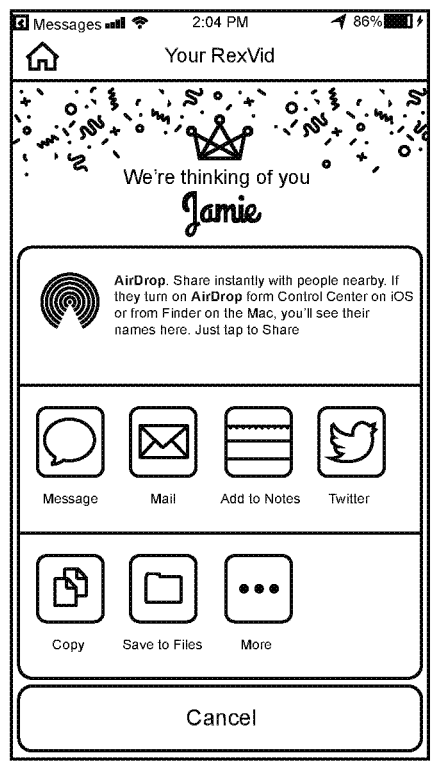

Referring again to FIG. 2A, the video stitching server 40 can finalize the collaborative video. The video stitching server 40 can store the collaborative video in the folder (290) and deliver the collaborative video (e.g., as edited, with an occasion-based message, etc.) to the recipient (291). The video stitching server 40 can deliver the collaborative video to the recipient's collaborative video application running on the recipient's mobile device. Referring back to the Mother's Day example provided above, suppose user 25 is the mother of users 20-24. The video stitching server 40 can deliver the Happy Mother's Day collaborative video from users 20-24 (children) to user 25 (mother). In some embodiments, the recipient's collaborative video application may provide one or more in-app notifications (e.g., banners, sounds, badges, etc.) to the recipient to notify him/her of the collaborative video. In some embodiments, the video stitching server 40 may send a notice of the collaborative video to the recipient's mobile device via text message (FIG. 3S). The text message may include a link to the recipient's collaborative video application, such that, when the user clicks on the link, the collaborative video application opens. In some embodiments, the link can be configured to re-direct the recipient's mobile device to an application store (or an app store application) if the recipient's mobile device does not yet have the collaborative video application. When the recipient opens his/her collaborative video application via the text message or directly, he/she may be able to view the collaborative video (FIG. 3T). In some embodiments, the collaborative video may be delivered to the initiator and/or the contributor(s) (e.g., in a manner similar to how the collaborative video is delivered to the recipient). In some embodiments, the recipient may be able to share the collaborative video on social media (FIG. 3U).

In some embodiments, delivering the collaborative video to the recipient's collaborative video application may include storing the collaborative video in a cloud-based video service (e.g., YouTube, Vimeo, etc.) and delivering a link to the recipient's collaborative video application. In such embodiments, the link may be associated with the collaborative video in the cloud-based video service. In such embodiments, the recipient may click on the link and be directed to the collaborative video stored in the cloud-based video service. In some such embodiments, the collaborative video may be exclusively available to the recipient. In some embodiments, the initiator and/or the contributor(s) may also be able to view the collaborative video from the cloud-based video service.

Embodiments disclosed herein may include a non-transitory computer readable medium that may store instructions for performing the above-described methods and any steps thereof, including any combinations of the same. In some instances, the non-transitory computer readable medium may be included with the video stitching server 40. At least one non-transitory computer-readable medium may include stored instructions to be executed by a processor of a computing device (e.g., video stitching server 40) for causing the computing device to interact with a collaborative video application running on multiple mobile devices. Such stored instructions may include receiving a collaborative video request like those discussed herein from the collaborative video application running on an initiator's mobile device (which may be the same as the recipient's mobile device). The stored instructions may cause the computing device to store the collaborative video request in a folder that has an identifier.

The instructions stored on the computer-readable medium may interact differently with the collaborative video applications depending on whether the collaborative video request is for a sentiment-expression collaborative video or for an event-based video. When the collaborative video request is for a sentiment-expression collaborative video, the instructions may cause the computing device to send a collaboration invitation like those discussed herein to potential contributors. In some embodiments, the stored instructions can cause the computing device to send a collaboration invitation like those discussed herein to each of the one or more potential contributors on the potential contributor's mobile device. When the collaborative video request is for an event-based collaborative video, the instructions stored on the computer-readable medium may cause the computing device to send the identifier to the initiator's collaborative video application to be displayed on the initiator's mobile device.

The instructions stored on the computer-readable medium may cause the computing device to gather videos, stitch them together, and deliver stitched-together videos to recipients' collaborative video applications. The instructions may cause the computing device to receive contributor video information (such as is discussed elsewhere herein) from the contributors' collaborative video applications. The contributors may be a subset of the potential contributors. The instructions may cause the computing device to store the contributor video(s) in the folder based on the identifier. The instructions may cause the computing device to stitch together at least two videos stored in the folder to create a collaborative video. The instructions may cause the computing device to deliver the collaborative video to the recipient's collaborative video application.

In embodiments in which the collaborative video request includes a time limit, the instructions stored on the video stitching server 40 may cause the computing device to act in accordance with the time limit. The instructions may cause the computing device to stitch together the at least two videos stored in the folder at a time that coincides with the time limit. The instructions may cause the computing device to deliver the collaborative video to the recipient's collaborative video application at a time that coincides with the time limit. In some embodiments, the instructions may cause the computing device to stitch together the at least two videos stored in the folder and deliver the collaborative video to the recipient's collaborative video application at a time that coincides with the time limit.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A method of creating a collaborative video for a recipient, comprising:
   receiving a collaborative video request at a video stitching server from a collaborative video application running on an initiator's mobile device, the collaborative video request comprising recipient information;
   storing, with the video stitching server, the collaborative video request in a folder, the folder having an identifier;
   providing the identifier to each of a plurality of potential contributors;
      receiving contributor video information at the video stitching server from the collaborative video application running on a mobile device of each of two or more contributors from among the plurality of potential contributors, the contributor video information including a respective contributor video and the identifier, wherein every potential contributor from the plurality of potential contributors that submits video information to the video stitching server using the identifier is included in the two or more contributors;
   storing, with the video stitching server, each of the contributor videos in the folder based on the identifier;
   stitching together, with the video stitching server, each of the contributor videos stored in the folder to create the collaborative video; and
   delivering, with the video stitching server, the collaborative video to the collaborative video application running on a mobile device of the recipient, wherein the recipient is different than each member of a group consisting of the initiator and each of the plurality of potential contributors, and wherein the mobile device of the recipient is different than each mobile device of a member of the group consisting of the initiator and each of the plurality of potential contributors.

2. The method of claim 1, wherein:
   the collaborative video request further includes an initiator video; and
   further stitching together, with the video stitching server, each of the contributor videos and the initiator video.

3. The method of claim 1, wherein:
   the collaborative video request further includes potential contributor identification information for the plurality of potential contributors; and
   providing the identifier to each of the plurality of potential contributors comprises sending, with the video stitching server, a collaboration invitation to each of the plurality of potential contributors on the potential contributor's mobile device, the collaboration invitation including the identifier, initiator information, the recipient information, and a request to record a video using the collaborative video application running on the potential contributor's mobile device and to upload the video to the video stitching server using the collaborative video application.

4. The method of claim 3, wherein providing the identifier to each of the plurality of potential contributors further comprises sending, with the video stitching server, a text message to each potential contributor's mobile device, the text message including a link to the potential contributor's collaborative video application.

5. The method of claim 4, wherein the link is configured to re-direct the potential contributor's mobile device to an application store if the potential contributor's mobile device does not yet have the collaborative video application.

6. The method of claim 1, wherein providing the identifier to each of the plurality of potential contributors comprises the initiator manually providing the identifier to each of the plurality of potential contributors, with the identifier included in the contributor video information having been manually added by the contributor to the contributor's collaborative video application.

7. The method of claim 1, wherein the collaborative video request further includes occasion information, the method further comprising delivering, with the video stitching server, an occasion-based message to the recipient's collaborative video application along with the collaborative video.

8. The method of claim 1, further comprising:
   sending, with the video stitching server, a text message to the recipient's mobile device, the text message including a link to the recipient's collaborative video application.

9. The method of claim 8, wherein the link is configured to re-direct the recipient's mobile device to an application store if the recipient's mobile device does not yet have the collaborative video application.

10. The method of claim 1, further comprising:
    sending, with the video stitching server, the collaborative video to the initiator's collaborative video application for editing; and
    receiving an edited version of the collaborative video at the video stitching server from the initiator's collaborative video application,
    wherein delivering the collaborative video to the recipient's collaborative video application comprises delivering the edited version of the collaborative video to the recipient's collaborative video application.

11. The method of claim 1, further comprising:
    charging, with the video stitching server, a payment amount to the initiator's collaborative video application, the payment amount corresponding to the collaborative video request; and
    receiving authorization for the payment amount at the video stitching server from the initiator's collaborative video application.

12. The method of claim 11, wherein:
the collaborative video request further comprises a quantity of anticipated contributor videos; and
the payment amount corresponds to the quantity of anticipated contributor videos.

13. The method of claim 12, further comprising:
determining, with the video stitching server, an excess video quantity that is equal to the quantity of anticipated contributor videos subtracted from a quantity of actual contributor videos stored in the folder; and
sending, with the video stitching server, an invitation to the initiator's collaborative video application to pay an additional payment amount that corresponds to the excess video quantity.

14. The method of claim 1, wherein:
the collaborative video request includes a time limit for receiving the contributor video information; and
stitching together the at least two videos stored in the folder and/or delivering the collaborative video to the recipient's collaborative video application at an expiration of the time limit.

15. The method of claim 1, wherein delivering the collaborative video to the recipient's collaborative video application comprises storing the collaborative video in a cloud-based video service and delivering a link to the recipient's collaborative video application, the link being associated with the collaborative video in the cloud-based video service.

16. At least one non-transitory computer-readable medium including stored instructions that, when executed by at least one processor of a computing device, cause the computing device to interact with a collaborative video application running on multiple mobile devices by at least:
receiving a collaborative video request from the collaborative video application running on an initiator's mobile device, the collaborative video request comprising recipient information;
storing the collaborative video request in a folder, the folder having an identifier;
providing the identifier to each of a plurality of potential contributors;
receiving contributor video information from the collaborative video application running on a mobile device of each of two or more contributors, the contributor video information including a contributor video and the identifier, wherein every potential contributor from the plurality of potential contributors that submits video information to the video stitching server using the identifier is included in the two or more contributors;
storing each of the contributor videos in the folder based on the identifier;
stitching together each of the contributor videos stored in the folder to create a collaborative video; and
delivering the collaborative video to the collaborative video application running on a mobile device of a recipient, wherein the recipient is different than each member of a group consisting of the initiator and each of the plurality of potential contributors, and wherein the mobile device of the recipient is different than each mobile device of a member of the group consisting of the initiator and each of the plurality of potential contributors.

17. The at least one non-transitory computer-readable medium of claim 16, wherein the recipient's mobile device comprises the initiator's mobile device.

18. The at least one non-transitory computer-readable medium of claim 16, wherein:
the collaborative video request further includes potential contributor identification information for the plurality of potential contributors;
the stored instructions, when executed by the at least one processor of the computing device, cause the computing device to interact with the collaborative video application running on the multiple mobile devices by further sending a collaboration invitation to each of the plurality of potential contributors on the potential contributor's mobile device, the collaboration invitation including the identifier, initiator information, the recipient information, and a request to record a video using the collaborative video application running on the potential contributor's mobile device and to upload the video using the collaborative video application to be stored in the folder; and
the one or more contributors are from among the plurality of potential contributors.

19. The at least one non-transitory computer-readable medium of claim 16, wherein the stored instructions, when executed by the at least one processor of the computing device, cause the computing device to interact with the collaborative video application running on the multiple mobile devices by further sending the identifier to the initiator's collaborative video application to be displayed on the initiator's mobile device.

20. The at least one non-transitory computer-readable medium of claim 16, wherein:
the collaborative video request includes a time limit for receiving the contributor video information; and
stitching together each of the contributor videos stored in the folder and/or delivering the collaborative video to the recipient's collaborative video application at an expiration of the time limit.

* * * * *